United States Patent [19]
Bowen

[11] Patent Number: 5,561,737
[45] Date of Patent: Oct. 1, 1996

[54] VOICE ACTUATED SWITCHING SYSTEM

[75] Inventor: Donald J. Bowen, Madison, N.J.

[73] Assignee: Lucent Technologies Inc., Murray Hill, N.J.

[21] Appl. No.: 239,771

[22] Filed: May 9, 1994

[51] Int. Cl.$^6$ ........................................... G10L 3/00
[52] U.S. Cl. .................. 395/2.84; 395/2.42; 381/92; 381/110; 379/206
[58] Field of Search ............... 395/2.84, 2.35–2.37, 395/2.42, 2.2; 381/110, 92; 379/202, 206

[56] References Cited

U.S. PATENT DOCUMENTS

| | | | |
|---|---|---|---|
| 3,755,625 | 8/1973 | Maston | 379/206 |
| 4,449,238 | 5/1984 | Lee et al. | 381/110 |
| 4,653,102 | 3/1987 | Hansen | 381/92 |
| 4,658,425 | 4/1987 | Julstrom | 381/81 |
| 4,965,775 | 10/1990 | Elko et al. | 367/119 |

OTHER PUBLICATIONS

Dorian Benkoil, "The Shure ST3000 System," *Teleconnect Magazine*, Jun. 1996.

*Primary Examiner*—Kee Mei Tung
*Attorney, Agent, or Firm*—Samuel R. Williamson

[57] ABSTRACT

A voice-actuated switching system connects one or more microphones to an audio line in accordance with the output signal levels from each of the microphones. To reduce the effects of degradation of speech signals due to reverberation and noise pickup, the switching system uses directional microphones housed in a circular enclosure and arranged in a conference array configuration with response patterns aimed outwardly from the center of the enclosure. The switching system also uses a voting algorithm to select for activation the appropriate microphones indicative of the position of one or more people speaking and a variable weighting factor for gradually turning on or off the signal from each activated microphone that is coupled to the audio line. Typically one microphone will be selected to monitor a person speaking. Since its response pattern is normally pointed in the direction of the person speaking, it is less sensitive to speaker echo due to reverberation. If two people are simultaneously speaking on opposite sides of the array of directional microphones, however, two generally opposed microphones are selected, and the amount of reverberation increases only slightly over the amount of reverberation that would be present if just a single microphone were employed.

40 Claims, 3 Drawing Sheets

VOICE ACTUATED SWITCHING SYSTEM

BACKGROUND OF THE INVENTION

1. Technical Field

This invention relates to audio systems and, more particularly, to systems for selectively connecting speech circuits to an audio line in response to voice signals.

2. Description of the Prior Art

Many companies now consider teleconferencing as a cost effective way of communicating among personnel at dispersed locations and thereby reduce the need for business travel. In an audio teleconferencing arrangement, a number of conferees at a location are placed in communication with a number of conferees at one or more remote locations via a telephone connection. The quality of the transmission between the separated groups of conferees is generally dependent upon the position of each conferee with respect to a microphone and loudspeaking device at each location. With a single microphone and loudspeaking device in the conference location room, the transmission is subject to degradation because some of the conferees are generally at a greater than optimum distance from the microphone and loudspeaking device.

It is well known to use a plurality of microphones appropriately spaced at each conferee location to improve the quality of the conference system. The microphone outputs are summed and the summed output is applied to the communication links between locations. In such an arrangement, each conferee can be within an acceptable distance from one of the microphones, whereby speech pickup is of relatively good quality. With all microphones turned on at one time, however, several undesirable effects occur. The total noise pickup is much greater than for a single microphone. The artificial reverberation effects occasioned by the delayed signal pickup from the more remote microphones severely lower the quality of the conference transmission. Further, electroacoustic instability can easily result from the plurality of the always turned on microphones. It is therefore desirable and known in the art to provide a switching arrangement which permits only that microphone closest to the talking conferee to be active so that reverberation and noise pickup are minimized.

Such an arrangement is commonly known as a "voting circuit." In the "voting circuit" arrangement, the loudest talker can capture control and lock out the other conferees at his or her location. This automatic switching between microphones responsive to the highest speech level microphones, however, may also result in transmission interruptions which adversely affect intelligibility and can result in unwanted interference occasioned by transient room noise. For example, a loud noise at one of the conference locations may completely turn off the controlling microphone. Further, since only one microphone is operative at a time, transfer of control from one microphone to another such as occasioned by the talking conferee moving from one position to another in a room location can result in speech transmission of varying quality, interruptions in transmission, and reverberation effects which vary with the talking conferee's position.

Various teleconferencing arrangements have been proposed and used heretofore for selecting a single microphone of a plurality of conferee microphones and for transmitting the signal from only the selected microphone. An example of such an arrangement is seen in U.S. Pat. No. 3,730,995, issued to M. V. Matthews on May 1, 1973. In this arrangement, each of a plurality of microphones is associated with a speech detector and a relay. In response to voice signals from one of the microphones, an associated speech detector activates its relay which connects the microphone to an audio line and generates a signal inhibiting the other relays. Another example is seen in U.S. Pat. No. 3,755,625, issued to D. J. Maston on Aug. 28, 1973. This patent discloses a multimicrophone-speakerphone arrangement using a comparator in combination with logic circuitry for selecting a microphone with the greatest output and connecting it to the speakerphone input while simultaneously disconnecting the other microphones.

Still another example is seen in U.S. Pat. No. 4,449,238, issued to B. H. Lee, et al. on May 15, 1984. This patent discloses a computer based sound system wherein a microphone with the greatest output level is "selected" while all others are either attenuated or off. Yet still another example is seen in U.S. Pat. No. 4,658,425 issued to S. D. Julstrom on Apr. 14, 1987. This patent discloses a microphone actuation control system in which three first-order-gradient (FOG) microphones, each having a heart-shaped (cardioid) polar response pattern, share a common housing with a loudspeaker. Each of the microphones faces outward so that the direction of maximum sensitivity emanates radially from the center of the housing. The overall pattern provided by the three microphones allows full room (360°) coverage, although normally only one microphone may be on. In the absence of local speech, each of these microphones is gated off. Unfortunately, some level of syllabic clipping occurs when a microphone turns on from a full off condition.

While these arrangements have been satisfactory in minimizing the degradation of the speech signals due to reverberation and noise pickup, it is nevertheless desirable to make the microphone selection technique appear to occur in as normal a manner as possible. That is, not only should the microphone voting circuit recognize and respond to the loudest conferee in the room as do the other conferees, but it should also allow other conferees in the room who speak simultaneously with the loudest conferee to be heard quickly and equally well by conferees at a remote location. And it is also desirable to avoid the syllabic clipping that occurs when a microphone turns on from the full off condition.

SUMMARY OF THE INVENTION

In accordance with the present invention, in a teleconferencing system a voice-actuated switching arrangement provides for the selecting of one or more microphones in accordance with the output signal levels from each of the microphones.

The voice actuated switching arrangement uses directional microphones to reduce the degradation of speech signals due to reverberation and noise pickup. In accordance with one illustrative embodiment of the invention, the voice actuated switching arrangement uses five directional microphones with sensitivity response patterns extending outwardly from the center of the device, and a voting algorithm or process to select for actuation the appropriate number of these microphones for effectively monitoring each person that speaks in a room. Typically, only one microphone will be selected to monitor a person speaking. Since a microphone's response pattern is normally directed toward the person speaking it will be less sensitive to speaker echo from the opposite wall. This reduces room reverberation which causes the hollow response common to speakerphones. If two people are speaking on opposite sides of the voice switching arrangement, two microphones are selected, and the amount of reverberation increases only slightly over the amount of reverberation present when a single microphone is selected.

In accordance with a feature of the invention, the output signal from the voice actuated switching arrangement is the weighted sum of all the microphones. The proportionate signal of each microphone in the weighted sum is determined both by the speech energy provided by each microphone and a variable weighing factor assigned to each microphone. The weighting factor is typically large for the microphone(s) selected by the voting algorithm to be active and zero for the non-selected microphones. These weighting factors are changed gradually making changes less noticeable to the conferees. During intervals of transitions in conversations, the weighting factor may be relatively large for several microphones simultaneously.

In accordance with another feature of the invention, first syllable clipping is also effectively not perceived by conferees because at least one microphone in the voice actuated switching arrangement is on at all times, and some signal is transmitted, even if attenuated.

BRIEF DESCRIPTION OF THE DRAWING

The invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
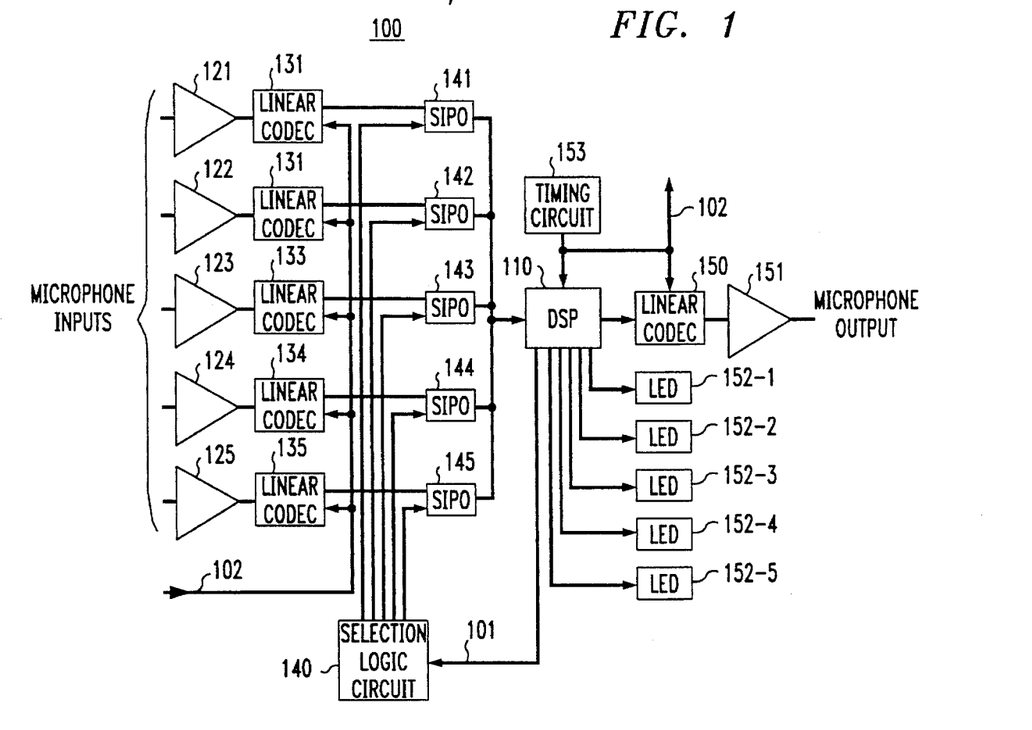
FIG. 1 is a block-level diagram of conference array microphone circuitry, arranged in accordance with the present invention.

Referring now to FIG. 1, there is shown a block-level diagram of conference array microphone (CAM) circuitry 100. Included in the CAM circuitry 100 is a digital signal processor (DSP) 110, five separate input circuits consisting of amplifiers 121 through 125 and respectively associated linear CODECs 131 through 135. Each one of these input circuits is associated with each one of first-order-gradient microphones contained in a CAM housing 200 shown in FIG. 2 and described later herein. The CAM circuitry 100 also includes a selection logic circuit 140 for selecting each one of the five input circuits for respectively providing its microphone signal to the DSP 110 via five serial-to-parallel converters 141 through 145. The output of the DSP 110 is provided to an output circuit comprising a linear CODEC 150 and an output amplifier 151. The DSP 110 and linear CODECs 131 through 135 and 150 all receive timing information from a timing circuit 153. Five light emitting diodes (LEDs) 152-1,-2,-3,-4,-5 are included in the CAM circuitry 100 for providing a visual indication for initial calibration of the CAM circuitry 100 as well as for providing a general visual indication to individuals present in the conference room as to which general area of the room is being covered by the microphone or microphones selected by the CAM circuitry 100.

In operation, each analog input signal from each microphone inputted into the CAM circuitry 100 is amplified by one of the linear amplifiers 121 through 125. Amplifiers suitable for use as amplifiers 121 through 125 are commercially available. Such an amplifier is the MC34074 unit available from, for example, Motorola. From each amplifier 121 through 125, the associated analog signal is respectively coupled into 16-bit linear CODECs 131 through 135 where each analog signal is digitized. CODECs suitable for use as CODECs 131 through 135 are commercially available. Such a CODEC is the AT&T7525 unit available from, for example, AT&T. Economical mu-Law CODECS are also available and will suitably provide the desired functions required by CODECs 131 through 135 and 150.

From the CODECs 131 through 135, each 16-bit digitized signal is serially loaded into two cascaded 8-bit serial-to-parallel registers. Five pairs of these cascaded registers respectively comprise the serial-to-parallel converters (SIPO) 141 through 145. Serial-to-parallel converters suitable for use as converters 141 through 145 are known in the art and are available from, for example, Motorola as part number MC74299.

The microphone input signals are weighted and summed together by DSP 110 to form the desired unitary microphone output signal. DSP 110 illustratively may comprise digital signal processor hardware such as the AT&T DSP16 or DSP32C along with read-only-memory (ROM) for storing software, which performs the processing operations described later herein, and random access memory (RAM) for storing DSP 110 results.

Through use of the selection logic circuit 140, the DSP 110 sequentially selects each one of the ten cascaded serial-to-parallel registers in converters 141 through 145 and reads in this data, 8-bits at a time through the lower 8-bits of its parallel-port. The DSP 110 provides a control signal to selection logic circuit 140 over line 101 at the proper time to allow the selection logic circuit to enable the appropriate one of the registers and thereby provide the correct 8-bit data signal to the DSP 110. Decoder circuits suitable for use as selection logic circuit 140 are known in the art and are available from, for example, National Semiconductor as part number 74154.

After the data input signals from the five microphones are received into DSP 110 and processed, as described in detail later herein, a 16-bit digital output signal is serially transmitted from DSP 110 to linear CODEC 150 in the microphone output circuit. The CODEC output signal is then amplified and conditioned by amplifier 151 to provide a standard analog microphone output signal.

The microphone output signal is not limited to just one or two microphone input signals, but rather is the weighted sum of all the microphone input signals. A variable weighting factor is assigned to each microphone and is used for gradually turning on or off the signal from each selected or activated microphone that is coupled to the audio line. The weighting factor is typically large for the selected microphone(s) and zero for the non-selected microphones. Since these weighted factors are adjusted gradually, they are therefore less noticeable to the users. During intervals of transitions in conversations the weighting factor may be relatively large for several microphones simultaneously.

A linear CODEC suitable for use as CODEC 150 is available from, for example, AT&T as part number AT&T7525. An amplifier suitable for use as amplifier 151 is available from, for example, Motorola as part number MC34074. The timing circuit 153 includes a 26 MHz crystal oscillator for the DSP 110 as well as a 2.048 MHz signal used by the CODECs for synchronization and transmission of data.

Figure 2:
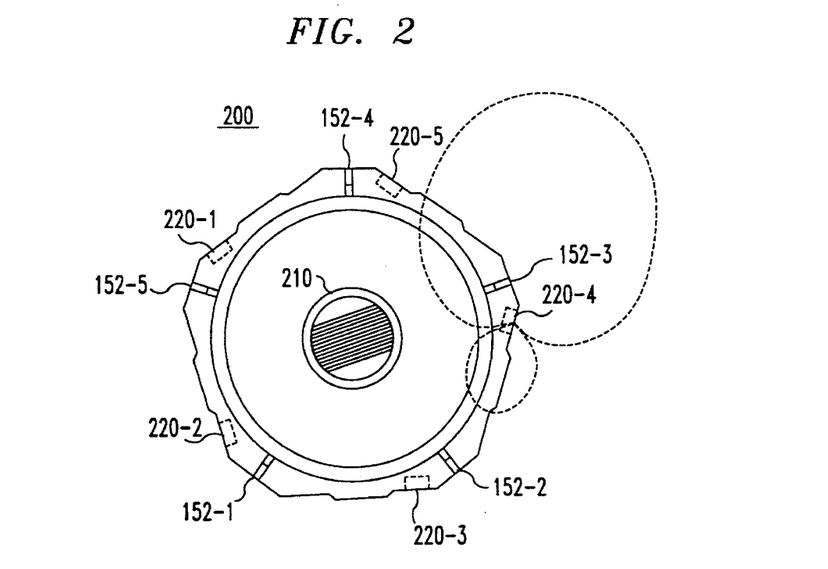
FIG. 2 is a top plan view of a conference array housing for enclosing the microphone circuitry shown in FIG. 1.

Shown in FIG. 2 is a top plan view of a CAM housing 200 including upwardly aimed loudspeaker 210, microphones 220-1,-2,-3,-4,-5, and LEDs 152-1,-2,-3,-4,-5 embedded in this housing. In the disclosed embodiment, the CAM housing 200 is configured with a plurality of directional first-order-gradient microphones of the type described in U.S. Pat. No. 5,121,426 which issued on Jun. 9, 1992. These microphones are mounted in a pentagon shaped housing illustrated by U.S. Pat. Des. No. 327,479. The plurality of first-order-gradient microphones, illustratively shown as five, are positioned in the pentagon shaped housing so as to face outward from the center of the housing and form supercardioid response patterns. The array of microphones provides full room coverage which is most useful in a conference telephone application. Since only one person speaks at a time during normal operation, background noise and reverberation are minimized by activating only the microphone which best receives that person's speech.

In accordance with the disclosed embodiment, the circuits shown in FIG. 1 are located within the CAM housing 200 and are arranged to compare the output signals from each of the microphones 220-1,-2,-3,-4,-5 to determine which one or more of these microphones are providing the stronger speech signals. In response, the signals from the selected microphone or microphones are transmitted to a conference participant at a remote location without the reverberation that normally results when more than one microphone is activated.

Loudspeaker 210 is located in the null of the polar response pattern of each of the microphones embedded in the housing 200. The null of the polar response pattern resides between the main lobe and an adjacent side lobe. This particular null is located at 125°—which accounts for the particular positioning of the microphones around the perimeter of the housing 200. This performance is achieved by placing a microphone element, as disclosed in U.S. Pat. No. 5,121,426, into the housing, thus forming a supercardioid polar response pattern. Although only the polar response pattern associated with a single microphone 220-4 is shown in FIG. 2, the response patterns of each of the microphones in the housing are identical. It is noted that the housing and the microphones contained therein cooperate to determine the shape of the response pattern.

Figure 3:
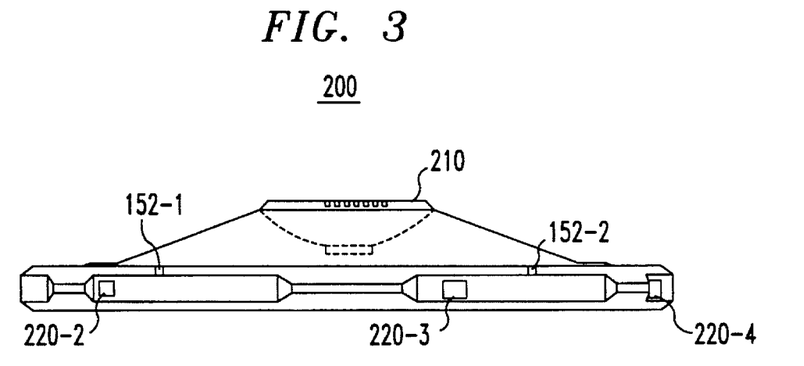
FIG. 3 is a front view of the conference array housing shown in FIG. 2.

A front view of the CAM housing 200 is shown in FIG. 3 to illustrate the relative positioning of three of the microphones 220-2, 220-3 and 220-4, and to demonstrate that such units can be attractively packaged in a low-profile product.

Figure 4:
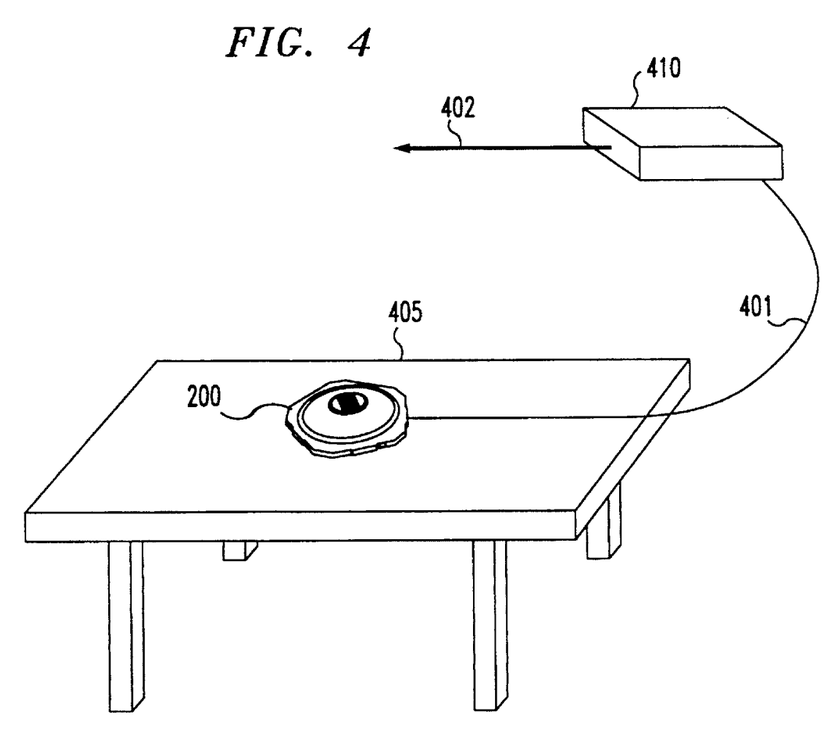
FIG. 4 is a teleconference system in which the present invention may be employed.

Shown in FIG. 4 is an embodiment of a teleconference system which includes the CAM housing 200 positioned in the center of a conference table 405. The CAM circuitry 100, incorporated in the CAM housing 200, is connected to a control unit 410 in the system by a cable 401 which may either pass through the table 405 via a hole drilled therein or may rest on the table top. This cable contains suitable wiring for conveying both the microphone output signal from the CAM housing 200 to the control unit and the input signal to the speaker 210 from the control unit 410. The cable also includes wiring for conveying power to a conventional power supply (not shown) in the CAM circuitry 100 which provides operating power for the circuitry shown in FIG. 1.

The control unit 410 is interconnected to a telephone tip-ring line (not shown) via line 402 for providing conventional telephone service for the teleconference system. The control unit receives the microphone output signal from amplifier 151, as shown in FIG. 1, and also directly provides an input signal for the speaker 210, shown in both FIGS. 2 and 3. A control unit suitable for use as control unit 410 is described in U.S. Pat. No. 5,007,046 entitled *Computer Controlled Adaptive Speakerphone* which is herein incorporated by reference. This control unit provides an improved switched-loss, adaptive speakerphone which dynamically adjusts its switching thresholds and other performance parameters based on an analysis of acoustic environment and telephone line conditions. The control unit disclosed in the referenced patent receives an output from a microphone and provides an input to a speaker for providing a speakerphone arrangement. The microphone output signal provided by amplifier 151 is readily substitutable for the microphone shown in the disclosed speakerphone arrangement. An alternative controlling arrangement suitable for use as control unit 410 is disclosed in U.S. Pat. No. 5,016,271 entitled *Echo Canceler-Suppressor Speakerphone* which is also herein incorporated by reference. Near-full and full duplex operation are regularly achieved with this alternative controlling arrangement since the receive path remains open at all times and the transmit path has its gain reduced only to the level necessary to suppress excess reverberant return echo.

Although the control unit 410 is shown as being apart from the CAM circuitry 100, it is to be understood that such control unit may also be integrated into the electronics inside the CAM housing 200. Even further, it is also to be understood that the CAM circuitry 100, when using well known cordless telephone circuitry, such as that in AT&T's 5500 HT cordless telephone set, may also be assembled so as to obviate the need for any cabling whatsoever between itself and a base unit or control unit which connects to the telephone tip-ring line. Such suitable cordless telephone circuitry is also disclosed in U.S. Pat. No. 4,736,404. For this cordless telephone circuitry as well as the CAM circuitry 100, a battery may be used for providing a suitable source of operating power.

Figure 5:
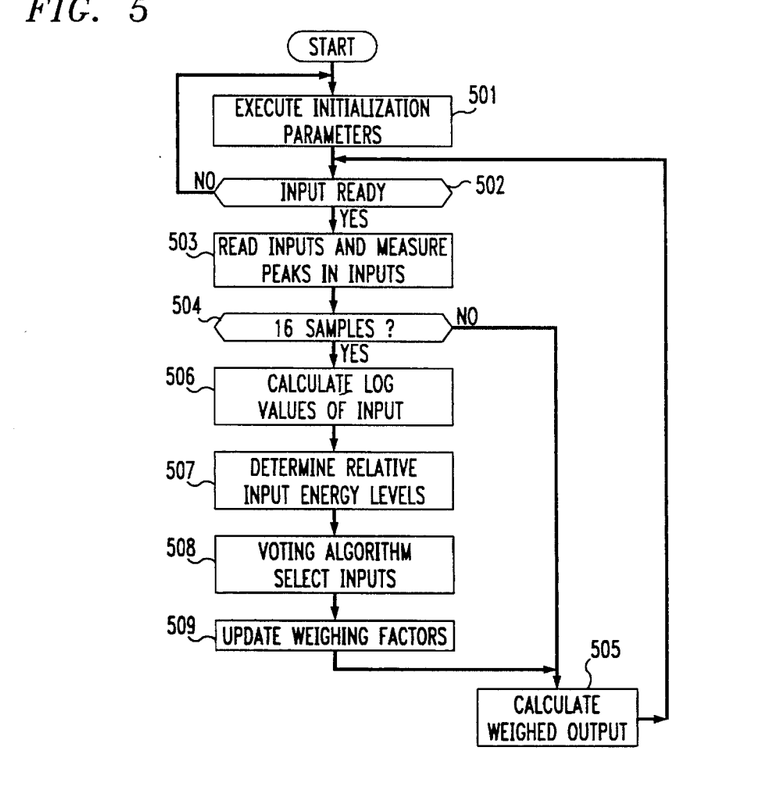
FIG. 5 is a flow chart of a process suitable for incorporation into the digital signal processor shown in FIG. 1, in accordance with the invention.

Referring next to FIG. 5, there is shown a flow chart illustrating the operation of the DSP 110 in executing the microphone selection operation. The functions provided by DSP 110 are advantageously determined by a process or program stored in associated read-only-memory (not shown).

The process is entered at step 501 where the initializing parameters are set. As part of these parameters, the weighting factor, described later herein, of any one of the five microphones, illustratively 220-1, is set to 1 thereby effectively turning ON that microphone. When this microphone is ON, first syllable clipping advantageously is not perceived by conferees because some speech signal always will be transmitted, even if it is attenuated due to the relative position of the ON microphone to the person speaking. Certain other initializing parameters are executed in accordance with U.S. Pat. No. 5,007,046. Once this initialization is performed and verified in decision 502, the circuitry is ready for signal data input and the process advances to step 503.

During each sampling period or every 125 μs, each one of the microphone inputs is sampled in step 503 for determining peak absolute values in the speech energy input. Also in each sampling period, the input value for each microphone is adjusted in accordance with its assigned weighting factor and then the weighted outputs of all the microphones are summed together onto a common audio line. The peak absolute values for the microphones are acquired from 16 samples over a 2 millisecond (ms) cycle period in order to obtain the highest absolute peak value occurring within this time period for each microphone. If during this cycle period of 2 ms, a subsequently measured peak value is greater than a previously measured and stored peak value, then the previously stored peak value is replaced with the subsequently measured peak value. If the previously measured peak value is greater than the subsequently measured peak value, however, then the previously measure peak value is retained in memory. The peak-absolute-value for each of the five microphone inputs is thereby determined in step 503 during each cycle period. The 16 samples gathered during each cycle period permit tracking the signal envelope for each microphone at 300 Hz, the lowest frequency of interest.

If 16 samples in the speech energy have not been measured for each microphone in step 503, as determined in decision 504, the process advances to step 505 where the weighted output for each microphone is calculated. This calculation is performed in accordance with the data processing rate or every 125 μs. If the CAM 100 has just been activated, the initializing parameters, as provided in step 501, determines the weighted output and thus the input signal just from the initially selected microphone is coupled to the analog output line at this point in the process. Once initialization is complete, however, the microphones in the CAM 100 are configured either in the ON or OFF state or in transition between these two states in accordance with the acoustics present in the room.

After 16 peak input values in the speech energy have been measured for each microphone, as determined by decision 504, the selected one of the peak input values is used to calculate a logarithmic value, for example, a $\log_{10}$ or decibel calculation, of the signal for each of the five microphone inputs in step 506. These logarithmic values, which simplify calculations of the relative signal strengths, are then used in step 507 to determine relatively long and short-term envelope energy for each of the five microphone peak inputs, the determination of the long and short-term envelope energy being described in greater detail later herein with reference to FIG. 6.

The envelope energy determined in step 507 is used by a voting algorithm or process in step 508 to select which microphone signal input(s) are to be passed through to the output. In executing the selection process, in one disclosed embodiment, the voting algorithm makes comparisons based on the maximum microphone signal selecting either 1) the current microphone; 2) an opposite microphone; or 3) both the current and an opposite microphone if their speech signal levels are relatively strong; or 4) under less restrictive criteria, the microphone with the strongest signal. Taken in the order given, each of the foregoing comparisons is made in a less restrictive manner than the one that precedes it. If the speech signal levels of the current and an opposite microphone are not sufficiently strong, the voting algorithm may choose any microphone based on less restrictive thresholds. When the speech signal levels are close to the background noise level, the voting algorithm makes comparisons only between the currently selected and two opposite microphones, remaining with the selected microphone if the comparisons are inconclusive.

Once the microphone input(s) are selected for activation or deactivation in step 508, the variable weighting factor for each microphone is updated in step 509 during each cycle period of 2 ms and these weighting factors used in determining the level of the signal for each microphone that gets coupled to the output. Thus in accordance with its selection or nonselection, the output from a microphone either remains ON, OFF, or is caused to transition toward one or the other of these two states in the calculation performed by step 505.

As noted, the output from the CAM circuitry 100 is a weighted signal derived from all the microphones, not simply those selected by the voting algorithm to be active or configured ON by this algorithm. Thus when a microphone is selected to be active by the voting algorithm, its input is gradually added to or made a greater percentage of the output signal of the output signal. Similarly, when a microphone is no longer selected or configured OFF after having been selected by the voting algorithm, its input is gradually removed from the output signal. First syllable clipping is also advantageously not perceived because at least one microphone is left on at all times, and speech generated anywhere in the room will be immediately detected and transmitted, even if attenuated.

The activation and deactivation weighting factor for a microphone is shown by:

$$W_i = \begin{cases} W_i = W_i + 0.05 \text{ if microphone}_i \text{ is configured ON} \\ W_i = W_i - 0.01 \text{ if microphone}_i \text{ is configured OFF} \end{cases}$$

and $$O = \sum_{i=1}^{5_i} I_i W_i$$

where $W_i$ is the weighting factor for microphone$_i$ having a range between 0 and 1.0;

$I_i$ is one of the five microphone inputs; and

O is the output value for the sum of each microphone's weighted signal.

Thus a microphone being turned-on is activated five times faster than a microphone being turned-off. One major advantage of this activation and deactivation arrangement is that any background noise that does not get removed, by the noise removal process described later herein, is less noticeable if slowly added and removed along with the microphone signal. This arrangement also permits multiple microphones to be ON at once because of the differences in the delays in the weighting factors for activating and deactivating the microphones. Thus, any undesirable side effects of the voting algorithm switching rapidly between microphones, such as that caused in hard-switching (immediately turning a microphone full-on or full-off), is eliminated. Thus, in effect, many people may respectively speak into and activate different microphones at the same time. To the extent that each person continues to speak, his or her microphone will remain ON or activated.

Figure 6:
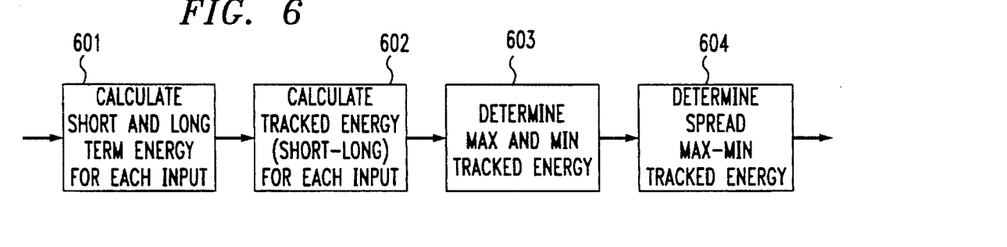
FIG. 6 is a flow chart of a process which shows in greated detail a portion of the process shown in FIG. 5.

Referring now to FIG. 6, there is shown a flow chart illustrating the steps involved in obtaining the measurements of the relative signal strengths for each of the microphones by the CAM circuitry 100. These steps 601 through 604 are all part of the step 507 executed in FIG. 5. Since the voting algorithm determines when one or more persons are speaking and then activates the microphone or microphones that best receives these speech signals, a critical component of this calculation is to correctly determine when the input signal from a microphone is that of speech and not just noise. The steps executed by the flow chart of FIG. 6 advantageously provides this information for use by the voting algorithm.

The received signal strength is calculated as in step 601 by averaging the peak-absolute-value selected for each microphone input, each peak-absolute-value being selected from those occurring over a 2 ms cycle period. There is both a short and a long-term energy average generated which represents speech signal strength and noise signal strength respectively. Different averaging factors are selected depending on whether the slope of the input values are positive or negative. When the slope is positive, the input values are increasing in strength and when the slope is negative, the input values are decreasing or decaying in strength. Both averages are calculated as $$rec_{s_i} = \begin{cases} 0.2 I_{n_i} + (1-0.2) rec_{s_i} & \text{if } I_{n_i} \geq I_{n-1_i} \\ 0.005 I_{n_i} + (1-0.005) rec_{s_i} & \text{if } I_{n_i} < I_{n-1_i} \end{cases}$$

$$rec_{l_i} = \begin{cases} 0.00024 I_{n_i} + (1-0.00024) rec_{l_i} & \text{if } I_{n_i} \geq I_{n-1_i} \\ 0.025 I_{n_i} + (1-0.025) rec_{l_i} & \text{if } I_{n_i} < I_{n-1_i} \end{cases}$$

where:

$rec_{s_i}$ and $rec_{l_i}$ are the respective short and long-term signal averages;

$I_{n_i}$ is the peak signal value for each input during the current cycle period; and $I_{n-1_i}$ is the peak signal value for each input during the previous cycle period.

Both quantities $rec_{s_i}$ and $rec_{l_i}$ are used in calculating the speech signal strength. The quantity $rec_{l_i}$ is a measure of background noise. The quantity $rec_{s_i}$ is a measure of intermittent signals such as voice, or any other sharp noise, along with any background noise. As indicated in step 602, the speech signal strength or tracked signal energy value, $rec_{t_i}$ for each microphone is calculated by subtracting the long-term average $rec_{l_i}$ from the short-term average $rec_{s_i}$ thusly:

$$rec_{t_i} = rec_{s_i} - rec_{l_i}$$

or

SPEECH=(SPEECH+NOISE)−NOISE

Since these are logarithmic values, the quantity $rec_{l_i}$ is not the difference in magnitude between the short and long term signal average values, but rather the ratio of the magnitudes of these two values.

The tracked signal values of each microphone are then sorted as in step 603 to determine maximum and minimum tracked signal energy values, RECMAX and RECMIN, among all of the microphones. Next SPREAD, which is the difference between RECMAX and RECMIN, is calculated in step 604. Since the background noise level is effectively removed from each microphone input, SPREAD should be at or close to zero when no intermittent signals are present. When SPREAD is greater than zero by some threshold, therefore, the voting algorithm interprets this as an indication that a speech signal is present and then looks at the respectively tracked signal strength value for each microphone to determine the source of the speech signal. SPREAD is a measure which is used to indicate that an intermittent signal such as a speech signal is present.

In response to the input parameters presented, the selection process selects the microphone which best picks up the speech signal. In selecting this microphone, the tracked signal strength values for the microphones are compared to each other. More specifically, pairs of microphones are examined, to determine the direction of origin for the speech, by seeking a microphone pair where the speech is strong in the forward facing microphone, i.e., the microphone directed toward the source of speech, and weak in the backward facing microphone, i.e., the microphone directed away from the source of speech. The speech is assumed to be in the null of the backward facing microphone. The null of each microphone is more narrow, and therefore more sensitive to direction, than is the main beam. The combination of the two microphones provides a better measure of the directionality of the speech signal.

Figure 7:
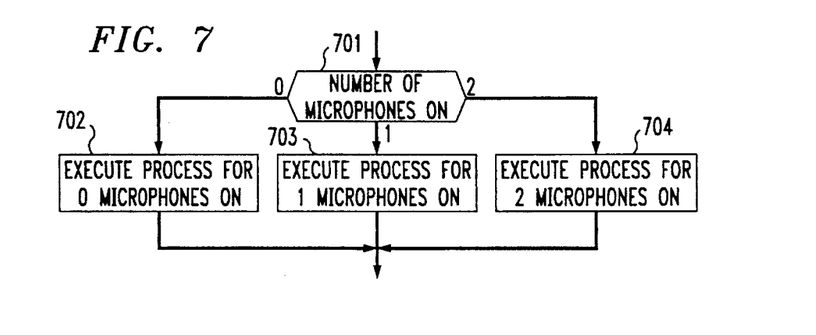
FIG. 7 is a flow chart of a process which shows in greated detail a portion of the process shown in FIG. 5.

Referring now to FIG. 7, there is shown in accordance with an embodiment of the invention, a flow chart showing additional steps embodied in step 508 of FIG. 5 which use the SPREAD value in selecting the appropriate microphones to be active.

As earlier indicated, the voting algorithm determines if a speech signal is present and selects the microphone(s), or beam(s), which best receive the speech signal(s). It uses the tracked signal values for each microphone or beam, the beam pattern being indicative of a particular microphone, and the RECMAX, RECMIN and SPREAD values to make decisions. In the ideal case, when there is a single strong speaker, SPREAD will be large indicating the presence of speech and the near microphone value will be equal to RECMAX and the generally opposite microphone will be equal to RECMIN. Unfortunately, this does not always occur and decision making becomes more difficult when there are multiple speakers, background noise is high, or when speakers are between microphones. The voting algorithm will attempt to choose a microphone with a tracked signal value within some threshold of RECMAX, and the associated opposite microphone with a tracked signal value within some threshold of RECMIN. The voting algorithm is therefore designed to be more robust and continue to function satisfactory under less than ideal conditions.

In accordance with the disclosed embodiment and as earlier noted herein, the microphones 220-1,-2,-3,-4,-5 are mounted in a pentagon shaped housing as clearly illustrated in FIG. 2. Thus, each one of the plurality of microphones is considered to have two opposite microphones. For example, microphone 220-1 has two generally opposite microphones, microphone 220-3 and microphone 220-4. For determining when a microphone's associated opposite microphone has a tracked signal value within some threshold of RECMIN, the tracked signal value for both of the opposite microphones is determined. The one of the two opposite microphones having the smallest tracked signal value is then considered as the selected opposite microphone and its tracked signal value then used by the voting algorithm in the decision making process of selecting the microphone or microphones which best receives the speech signal.

The decision 701 in FIG. 7 considers, for simplicity, three illustrative conditions of the CAM circuitry 100 in having 1) no microphones ON, 2) one microphone ON, or 3) two microphones ON. It is to be understood that operation of the CAM circuitry 100 with additional microphones turned ON or activated up to and including all of the available microphones is theoretically possible, even though such operation would only occasionally be necessary. In either case, such operation with the disclosed CAM circuitry 100 is possible and is anticipated. As noted, the condition where no microphones are turned-on, as shown in step 702, is for a start up condition when the CAM circuitry 100 is first turned ON from an off state. Once the CAM circuitry 100 has been turned ON, the relative input energy levels of each microphone input is determined and either a single or two microphones are selected in accordance with the processes executed in steps 703 and 704. Thus, in this simplified example, the process is shown existing in either one of the two illustrated states, i.e., either a single or two opposite microphones are selected when in the ON condition.

For the typical case when one microphone or beam is currently selected to be ON, as in step 703, and the SPREAD is large, the process continually recycles through the processing steps for determining if 1) the same microphone should continue to be ON, 2) an opposite microphone should be selected instead, 3) the same microphone and the opposite microphone should both be ON, or, 4) if neither of these three tests proves satisfactory, the process checks each input and chooses the first input exceeding a minimum threshold amount which is indicative of the presence of a low level speech signal. Otherwise, it chooses to remain with the currently selected microphone. One microphone or beam is always left ON, even when the value of SPREAD is low, indicating that there are no speech signals present. This avoids first syllable clipping and erroneous decisions due to noise or when no speech is present.

Also when two opposite beams are ON, the process determines if both should remain ON, or if only one of the two should be selected to remain ON. A comparison test between the two beams is performed as in step 704 and if a clear choice is unavailable, the process checks each input for the first one exceeding a minimum threshold amount. If neither one exceeds this minimum threshold amount, both beams are left ON. Such sequence of elementary operations is illustrated in pseudo code in Appendix A. This code provides one possible sequence of operations for achieving, via the DSP indicated, the voice actuated switching system shown in the Figures and described in the foregoing description. It is to be understood that other different sequences for achieving this same advantageous operation are possible and are anticipated.

Various other modifications of this invention are therefore contemplated and may obviously be resorted to by those skilled in the art without departing from the spirit and scope of the invention as hereinafter defined by the appended claims.

Appendix A

```
/*===============================================================
/*         main and support routines */ main()

5   {

/* initialization */ set mic1 ON and weight to 1.0

/* main loop */ for each 125 microsecond sample {
10                      calc_output()
                        update_peaks()

every 16th sample {
                                calc_mic_levels()
                                calc_spread()
15                              vote()
                        }
                }
    }

/*===============================================================
20  /*         125 microsecond sample processing routines
    /*/

/* calculate output from weighted microphone inputs */ calc_output()
    {
```

```
            sum = 0 for each mic {
                    sum += mic_input * weight output sum
 5      }

/*----------------------------------------------------------------------
    /* update peak values for each microphone */ update_peaks()
    {
10          for each mic
                    if (mic_input > peak)
                            peak = mic_input
    }

/*=====================================================================
15  /*          every 16th sample processing routines
    /*/

/*          calculate microphone signal levels */ calc_mic_levels()
    {
20          for each mic {
                    calculate average signal and noise levels
                    rect = signal - noise level
            }
    }

25  /*=====================================================================
        /*          update range of microphone levels used by voting */ calc_spread()
    {
```

```
           for each mic {
                  if (mic_level > RECMAX)
                         RECMAX = rect if (mic_level < RECMIN)
5                        RECMIN = rect
           }

SPREAD = RECMAX - RECMIN
    }

/*================================================================
```

```
10  vote()
    {
           if (only one mic ON)
                  goto one_beam_on()
           else
15                goto two_beam_on()
    }
    /*----------------------------------------------------------------
    /*     voting support routines */

/*     determine if currently selected microphone is best choice */

20  pick_near_beam (thres_a, thres_b)
    {
           if ( (RECMAX - rect(near) <= thres_a)
                              && (rect(opp) - RECMIN) <= thres_b )
                  return TRUE
25         else
                  return FALSE
    }

/*     determine if current and opposite microphone should be chosen */ pick_two_beams (thres_a, thres_b)
```

```
        {
                if ( (RECMAX - rect(near)) <= thres_a)
                                        && (RECMAX - (rect(opp)) <= thres_b )
                        return TRUE
 5              else
                        return FALSE
        }

/*              determine if opposite microphone should be chosen */ pick_opp_beam (thres_a, thres_b)
10      {
                if ( (rect(near) - RECMIN) <= thres_a)
                                        && ((RECMAX - rect(opp)) <= thres_b )
                        return TRUE
                else
15                      return FALSE
        }

/*----------------------------------------------------------------
        /*              adjust weight value */ update_weight()
20      {
                for each mic {
                        if (mic should be ON && weight < 1.0)
                                weight += 0.05 if (mic should be OFF && weight > 0.0)
25                              weight -= 0.01
                }
        }

/*----------------------------------------------------------------
        /*              voting strategy - depends on magnitude and range of mic levels 30      one_beam_on()
```

```
            {
                    if (SPREAD > 1.5) {
                            if (pick_near_beam (1.0, 1.0))
                                    goto update_weight()              /* pick current beam */

5                          if (pick_two_beams (2.0, 2.0))
                                    goto update_weight()              /* pick two beams */ if (pick_opp_beam (0.5, 0.4))
                                    goto update_weight()              /* pick opposite beam */ for (each beam)
10                                  if (pick_near_beam (0.0, 9.0))
                                            goto update_weight()

goto update_weight()
                    } else if (RECMAX >= 6.0) {
15                          if (pick_near_beam (1.0, 1.0))
                                    goto update_weight()              /* pick current beam */ if (pick_two_beams (2.0, 2.0))
                                    goto update_weight()              /* pick two beams */
                    }

20                  else {
                            if (pick_two_beams (2.0, 2.0))
                                    goto update_weight()              /* pick two beams */
                    }

25                  goto update_weight()                              /* leave current beam ON */
            } two_beams_on ()
            {
```

```
    if (SPREAD > 3.0) {
        if (pick_near_beam (0.3, 0.3) for first beam) {
            turn second beam OFF
            goto update_weight()
        } if (pick_near_beam (0.3, 0.3) for second beam) {
            turn first beam OFF
            goto update_weight()
        } for (each beam)
            if (pick_near_beam (0.2, 0.51)
                goto update_weight()
        } goto update_weight ()                      /* leave both beams ON */
    }

/*===============================================================
```

I claim:

1. A voice-actuated switching system comprising:

a plurality of circuits for receiving a plurality of speech signals;

means for selecting at least one of the plurality of speech signals for coupling to an output line, said selecting means selecting for coupling to the output line speech signals that exceed a predetermined minimum threshold;

means for assigning a variable weighting factor to each one of the received speech signals, each weighting factor being assigned responsive to the selecting means for controlling a level that its assigned speech signal is coupled to the output line; and means for commonly connecting the plurality of received speech signals to the output line, each one of said plurality of speech signals being either gradually added to or removed from the output line in accordance with the assigned weighting factor for each one of said plurality of speech signals.

2. The system in accordance with claim 1 wherein the plurality of received speech signals are commonly connected to the output line as a weighted sum.

3. The system in accordance with claim 1 wherein the selecting means includes measuring means for determining a magnitude of a speech energy level in each one of the plurality of received speech signals.

4. The system in accordance with claim 3 wherein said at least one of the plurality of speech signals selected by the selecting means has the greatest magnitude of speech energy level among the received speech signals.

5. The system in accordance with claim 3 wherein the measuring means further includes means for determining the relative magnitude of the energy level in each one of the plurality of received speech signals by comparing the energy level in each of the plurality of received speech signals with the energy level in each other of the plurality of received speech signals.

6. The system in accordance with claim 5 wherein the selecting means further includes means for sorting the received speech signals according to their relative energy levels for obtaining minimum and maximum tracked signal values in the plurality of received speech signals.

7. The system in accordance with claim 6 wherein the selecting means includes means for continually selecting a first selected speech signal associated with a first microphone when said selected first speech signal has a tracked signal value within a predetermined threshold amount of the maximum tracked signal value and a second speech signal associated with a second microphone disposed generally opposite to said first microphone has a tracked signal value within a predetermined threshold amount of the minimum tracked signal value.

8. The system in accordance with claim 7 wherein the selecting means includes means for continually selecting said first selected speech signal when said maximum tracked signal value exceeds said minimum tracked signal value by a predetermined threshold amount.

9. The system in accordance with claim 7 wherein the selecting means includes means for selecting a third speech signal in place of said first selected speech signal, said third speech signal being associated with a third microphone and selected when said third speech signal has a tracked signal value within a predetermined threshold amount of the maximum tracked signal value and a fourth speech signal associated with a fourth microphone disposed generally opposite to said third microphone has a tracked signal value within a predetermined threshold amount of the minimum tracked signal value.

10. The system in accordance with claim 7 wherein the selecting means further includes means for selecting a third speech signal along with the selected first speech signal, the third speech signal being associated with a third microphone and being selected when said third speech signal has a tracked signal value within a predetermined threshold amount of the maximum tracked signal value and a fourth speech signal associated with a fourth microphone disposed generally opposite to said third microphone has a tracked signal value within a predetermined threshold amount of of the minimum tracked signal value.

11. The system in accordance with claim 6 wherein the selecting means includes means for selecting for coupling to the output line a first received speech signal having a tracked signal value that exceeds by at least a predetermined threshold amount the tracked signal value of a second received speech signal.

12. The system in accordance with claim 11 wherein the tracked signal value for the second received speech signal is the minimum tracked signal value in the plurality of received speech signals.

13. The system in accordance with claim 6 further comprising monitoring means for continually monitoring the plurality of received speech signals for determining the tracked signal values for each of the plurality of received speech signals.

14. The system in accordance with claim 1 further including means for varying an assigned weighting factor for a received speech signal over a range between one and zero, the received speech signal being coupled unattenuated to the output line when the weighting factor has a value of one, and the received speech signal being attenuated and not coupled to the output line when the weighting factor has a value of zero.

15. The system in accordance with claim 14 wherein the received speech signal is coupled to the output line attenuated in an amount directly proportional to a product of the assigned weighting factor and the level of the received speech signal when said weighting factor has a value greater than zero and less than one.

16. The system in accordance with claim 15 further including clocking means for periodically adjusting the weighting factor for the received speech signal during a first time period that said speech signal is selected by the selecting means, the weighting factor either increasing from zero toward the value of one or remaining at the value of one during said first time period.

17. The system in accordance with claim 16 wherein the clocking means periodically adjusts the weighting factor for the received speech signal during a second time period that said speech signal is not selected by the selecting means, the weighting factor either decreasing from a value of one toward zero or remaining at zero during said second time period.

18. The system in accordance with claim 17 wherein the clocking means adjusts the weighting factors in first incremental steps during said first time period and in second incremental steps during said second time period, each of said first incremental steps being larger than said second incremental steps.

19. The system in accordance with claim 15 further including clocking means for periodically adjusting the weighting factor for the received speech signal during a first time period that said speech signal is selected by the selecting means, the weighting factor either increasing from some value less than one toward a value of one or remaining at the value of one during said first time period.

20. The system in accordance with claim 19 wherein the clocking means periodically adjusts the weighting factor for the received speech signal during a second time period that said speech signal is not selected by the selecting means, the weighting factor either decreasing from some value less than one toward zero or remaining at zero during said second time period.

21. The system in accordance with claim 20 wherein the clocking means adjusts the weighting factors in first incremental steps during said first time period and in second incremental steps during said second time period, each of said first incremental steps being larger than said second incremental steps.

22. A method of connecting speech signals from a plurality of speech circuits to an output line, the method comprising the steps of:

receiving a plurality of speech signals in the plurality of circuits;

selecting at least one of the plurality of speech signals for coupling to an output line, said selecting step selecting for coupling to the output line speech signals that exceed a predetermined minimum threshold;

assigning a variable weighting factor to each one of the received speech signals, each weighting factor being assigned responsive to the selecting step for controlling a level that its assigned speech signal is coupled to the output line;

commonly connecting the plurality of received speech signals to the output line, and gradually adding or removing each one of said plurality of speech signals from the output line in accordance with the assigned weighting factor for each one of said plurality of speech signals.

23. The method of claim 22 wherein the plurality of received speech signals are commonly connected to the output line as a weighted sum.

24. The method of claim 23 wherein the selecting step includes the step of measuring a magnitude of a speech energy level in each one of the plurality of received speech signals.

25. The method of claim 24 wherein the measuring step further include the step of determining the relative magnitude of the energy level in each one of the plurality of received speech signals by comparing the energy level in each of the plurality of received speech signals with the energy level in each other of the plurality of received speech signals.

26. The method of claim 25 wherein the selecting step further includes the step of sorting the received speech signals according to their relative energy levels for obtaining minimum and maximum tracked signal values in the plurality of received speech signals.

27. The method of claim 26 wherein the selecting step further includes the step of selecting for coupling to the output line a first selected speech signal associated with a first microphone when said selected first speech signal has a tracked signal value within a predetermined threshold amount of the maximum tracked signal value and a second speech signal associated with a second microphone disposed generally opposite to said first microphone has a tracked signal value within a predetermined threshold amount of the minimum tracked signal value.

28. The method of claim 27 further including the step of selecting for coupling to the output line a third speech signal in place of said first selected speech signal, said third speech signal being associated with a third microphone and selected when said third speech signal has a tracked signal value within a predetermined threshold amount of the maximum tracked signal value and a fourth speech signal associated with a fourth microphone disposed generally opposite to said third microphone has a tracked signal value within a predetermined threshold amount of the minimum tracked signal value.

29. The method of claim 27 further including the step of selecting for coupling to the output line a third speech signal along with the selected first speech signal, the third speech signal being associated with a third microphone and being selected when said third speech signal has a tracked signal value within a predetermined threshold amount of the maximum tracked signal value and a fourth speech signal associated with a fourth microphone disposed generally opposite to said third microphone has a tracked signal value within a predetermined threshold amount of the minimum tracked signal value.

30. The method of claim 22 further including the step of varying an assigned weighting factor for a received speech signal over a range between one and zero, the received speech signal being coupled unattenuated to the output line when the weighting factor has a value of one, and the received speech signal being attenuated and not coupled to the output line when the weighting factor has a value of zero.

31. The method of claim 30 further including the step of coupling the received speech signal to the output line attenuated in an amount directly proportional to a product of the assigned weighting factor and the level of the received speech signal when said weighting factor has a value greater than zero and less than one.

32. The method of claim 31 further including the step of periodically adjusting the weighting factor for the received speech signal during a first time period that said speech signal is selected by the selecting step, the weighting factor either increasing from zero toward the value of one or remaining at the value of one during said first time period.

33. The method of claim 32 further including the step of periodically adjusting the weighting factor for the received speech signal during a second time period that said speech signal is not selected by the selecting step, the weighting factor either decreasing from a value of one toward zero or remaining at zero during said second time period.

34. The method of claim 22 further including the steps of:

selecting one from a plurality of microphones for connecting speech signals received therein to the output line, each one of said plurality of microphones being respectively associated with one of said plurality of circuits;

determining both a long and short term energy average for the speech signal in each of the plurality of speech circuits, each one of the plurality of circuits being respectively associated with one in a plurality of microphones, and the long term energy average being indicative of a noise signal and the short term energy average being indicative of both the noise signal and a speech signal;

subtracting the long term energy average from the short term energy average for determining a tracked speech signal value;

sorting the tracked speech signal value for each microphone for determining minimum and maximum tracked signal values among the microphones;

periodically examining the tracked speech signal value of each microphone for determining when at least a predetermined minimum difference exists between minimum and maximum tracked signal values; and connecting the speech signal from the microphone having the maximum tracked signal value to the output line.

35. The method of claim 34 wherein the microphone having the maximum tracked signal value is indicative of a direction of the source of the speech signal.

36. The method of claim 22 further including the steps of:

selecting a variable number from a plurality of microphones for connecting speech signals received therein to the output line, each one of said plurality of microphones being respectively associated with one of said plurality of circuits;

determining both a long and short term energy average for the speech signals in each of the plurality of speech circuits, the long term energy average being indicative of a noise signal and the short term energy average being indicative of both the noise signal and a speech signal;

subtracting the long term energy average from the short term energy average for determining a tracked speech signal value;

sorting the tracked signal value for each microphone for determining minimum and maximum tracked signal values among the microphones;

periodically examining the tracked signal value of each microphone for determining when at least a predetermined minimum difference exists between minimum and maximum tracked signal values, each microphone having a tracked signal value exceeding the predetermined minimum difference being indicative of a direction of a source of speech signals; and connecting to the output line the speech signals from the microphones having the tracked signal values that exceed the predetermined minimum difference.

37. A voice-actuated switching apparatus comprising:

a plurality of circuits for receiving a plurality of speech signals;

means for selecting at least one of the plurality of speech signals for coupling to an output line, said selecting means selecting for coupling to the output line speech signals that exceed a predetermined minimum threshold;

means responsive to the selecting means for assigning a variable weighting factor to each one of the received speech signals, each weighting factor controlling a level that its assigned speech signal is coupled to the output line; and means for providing a weighted sum of the plurality of received speech signals to the output line in accordance with the assigned weighting factor for each of the plurality of speech signals.

38. The apparatus in accordance with claim 37 further including means for varying an assigned weighting factor for a received speech signal over a range between one and zero, the received speech signal being coupled unattenuated to the output line when the weighting factor has a value of one, and the received speech signal being attenuated and not coupled to the output line when the weighting factor has a value of zero.

39. The apparatus in accordance with claim 38 wherein the received speech signal is coupled to the output line attenuated in an amount directly proportional to a product of the assigned weighting factor and the level of the received speech signal when said weighting factor has a value greater than zero and less than one.

40. A voice-actuated switching system comprising:

a plurality of circuits for receiving a plurality of speech signals;

means for selecting at least one of the plurality of speech signals for coupling to an output line, said selecting means identifying a stronger one of the speech signals by comparing the energy level in each of the plurality of received speech signals with the energy level in each other of the plurality of received speech signals;

means for assigning a variable weighting factor to each one of the received speech signals, each weighting factor being assigned responsive to the selecting means for controlling a level that its assigned speech signal is coupled to the output line; and means for commonly connecting the plurality of received speech signals to the output line, each of said plurality of speech signals being either gradually added to or removed from the output line in accordance with the assigned weighting factor for each one of said plurality of speech signals.

* * * * *